United States Patent

[11] 3,624,039

[72] Inventors Henry O. Colomb, Jr.
South Charleston;
Robert D. Lundberg, St. Albans, both of W. Va.
[21] Appl. No. 422,494
[22] Filed Dec. 31, 1964
[45] Patented Nov. 30, 1971
[73] Assignee Union Carbide Corporation

[54] FLUORINATED KETONE INTERPOLYMERS WITH ALDEHYDES AND MIXTURES OF ALDEHYDES AND EPOXIDES
13 Claims, No Drawings

[52] U.S. Cl. .................................................. 260/64,
260/2 EP, 260/2 BP, 260/30.2, 260/32.8 R,
260/32.8 EP, 260/33.8 R, 260/33.8 EP, 260/33.8 F, 260/67 R
[51] Int. Cl. .................................................. C08g 3/00, C08g 15/00
[50] Field of Search .................................. 260/63, 6 A, 2 EP, 67 R

[56] References Cited
UNITED STATES PATENTS
2,504,054  4/1950  Tawney .................. 260/45.5

Primary Examiner—William H. Short
Assistant Examiner—L. L. Lee
Attorneys—Paul A. Rose, Louis C. Smith, Jr., Francis M. Fazio and John S. Piscitello ABSTRACT: Interpolymers of fluorinated ketones and at least one member selected from the group consisting of aldehydes, epoxides and ketones other than such fluorinated ketones.

FLUORINATED KETONE INTERPOLYMERS WITH ALDEHYDES AND MIXTURES OF ALDEHYDES AND EPOXIDES

This invention relates to interpolymers of fluorinated ketones. More particularly, this invention relates to interpolymers of fluorinated ketones and at least one member selected from the group consisting of aldehydes, epoxides, and ketones other than such fluorinated ketones.

The novel interpolymers of the instant invention contain (a) recurring oxide units of the formula

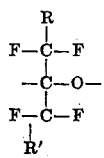

wherein R and R', when taken individually, each represent hydrogen, halogen, preferably fluorine or chlorine, or an alkyl radical having from one to seven carbon atoms, which radical can be substituted with halogen atoms, preferably fluorine or chlorine, and when taken collectively, represent a valence bond linking the fluorinated carbon atoms depicted or a divalent saturated hydrocarbon radical which together with the terminal carbon atoms to which they are attached make up a monocyclic radical having from three to about 10 carbon atoms, preferably from four to eight carbon atoms, which monocyclic radical can be substituted with halogen atoms, preferably fluorine or chlorine, and, (b) recurring oxide units selected from the group consisting of (1) 

wherein $R^2$ represents hydrogen or a monovalent organic radical containing carbon and hydrogen atoms, i.e. a hydrocarbon radical, wherein the carbon atom adjacent the aldehyde moiety is aliphatic (including cycloaliphatic), which radical can also contain oxygen and halogen atoms, (2) 

wherein $R^3$, $R^4$, $R^5$, and $R^6$, when taken individually, each represent hydrogen or a monovalent organic radical containing carbon and hydrogen atoms, i.e. a hydrocarbon radical, which radical can also contain oxygen and halogen atoms, while any two of $R^3$, $R^4$, $R^5$, and $R^6$, when attached to different carbon atoms and taken collectively, represent a divalent hydrocarbon radical which together with the terminal carbon atoms to which they are attached maked up a monocyclic radical having from four to about 10 carbon atoms, preferably from four to eight carbon atoms, which monocyclic radical can be substituted with monovalent organic radicals containing carbon and hydrogen atoms, and optionally oxygen and halogen atoms, provided, however, that the monocyclic radical and its substituents contain no more than about 10 carbon atoms, and, (3) 

wherein $R^7$ and $R^8$, when taken individually, each represent a monovalent organic radical containing carbon and hydrogen atoms, i.e. a hydrocarbon radical, wherein the carbon atom adjacent the carbonyl moiety is aliphatic (including cycloaliphatic), which radical can also contain oxygen and halogen atoms, and when taken collectively, represent a divalent hydrocarbon radical which together with the terminal carbon atom to which they are attached make up a monocyclic radical having from three to about 10 carbon atoms, preferably from four to eight carbon atoms, which monocyclic radical can be substituted with monovalent organic radicals containing carbon and hydrogen atoms, and optionally oxygen and halogen atoms, provided, however, that the monocyclic radical and its substituents contain no more than about 10 carbon atoms. When $R^2$, $R^3$, $R^4$, $R^5$, $R^6$, $R^7$, and $R^8$ are taken individually and are other than hydrogen, they each can have from one to about 12 carbon atoms, preferably from one to six carbon atoms.

The oxygen atoms present in the radicals designated by $R^2$, $R^3$, $R^4$, $R^5$, $R^6$, $R^7$, and $R^8$ above, can be in the form of etheric oxygen or esteric oxygen, i.e. ether or ester groups can be present. When these radicals are free of such oxygen containing moieties, they represent, in those situations where they designate radicals other than hydrogen, hydrocarbon and halo-substituted hydrocarbon radicals such as alkyl, haloalkyl, alkenyl haloalkenyl, aryl, haloaryl, cycloalkyl, halocycloalkyl, aralkyl, alkaryl, and the like, except that $R^2$, $R^7$, and $R^8$ cannot designate groups such as aryl, haloaryl, and alkaryl, as they must have an aliphatic carbon atom adjacent the aldehyde or carbonyl moiety. Among the radicals which $R^2$, $R_3$, $R^4$, $R^5$, $R^6$, $R^7$, and $R^8$ represent are methyl, ethyl, n-propyl, n-butyl, isobutyl, n-pentyl, n-hexyl, cyclohexyl, 2-ethyl hexyl, n-dodecyl, vinyl, allyl, benzyl, phenethyl, and the like. $R^3$, $R^4$, $R^5$, and $R^6$ can also represent in addition to the above, such radicals as phenyl, tolyl, p-chlorophenyl, p-bromophenyl, m-ethylphenyl, and the like. R and $R^1$ can represent such radicals as methyl, ethyl, n-propyl, n-butyl, isobutyl, n-pentyl, n-hexyl, and the like.

The epoxides employed in producing the interpolymers of the instant invention have a single vicinal epoxy group and are free of other functional groups which are reactive under the polymerization conditions employed. The epoxides suitable for use can be represented by the formula

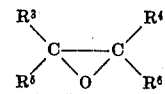

wherein $R^3$, $R^4$, $R^5$, and $R^6$ are as above defined. Representative of the various type epoxides included within such formula are the alkylene oxides, the epoxyalkenes, the aliphatic haloepoxides, the cycloalkyl-substituted alkylene oxides, the aryl-substituted alkylene oxides, the alkaryl-substituted alkylene oxides, the haloaryl-substituted alkylene oxides, the aryloxy-substituted alkylene oxides, the epoxycycloalkanes, the alkenyl-substituted epoxycycloalkanes, the cycloalkyloxy-substituted epoxycycloalkanes, and the like. Illustrative of the many epoxides which can be employed are ethylene oxide, 1,2-epoxypropane, 3-bromo-1,2-epoxypropane, 3-chloro-1,2-epoxypropane, 1,2-epoxybutane, 2,3-epoxybutane, 3-chloro-1,2-epoxybutane, 1,4-dichloro-2,3-epoxybutane, 3,4-dichloro-1,2-epoxybutane, 4-chloro-2,3-epoxybutane, 3,4-epoxy-1-butene, 1-chloro-3,4-epoxy-1-butene, 1,2-epoxypentane, 3-ethyl-2,3-epoxypentane, 4cyclohexyl-2,3-epoxypentane, 1-chloro-2,3-epoxypentane, 4-chloro-2,3-epoxypentane, 3-chloro-1,2-epoxypentane, 1,4-dichloro-2,3-epoxypentane, 3,4-epoxy-1-pentene, 1-chloro-2,3epoxyhexane, 5-benzyl-2,3-epoxyheptane, 5-butyl-3,4-epoxyoctane, 1,2-epoxynonane, 1,2-epoxydecane, 1,2-epoxydodecane, epoxycyclopentane, epoxycyclohexane, 2,3-epoxymethylcyclohexane, 3,4-epoxyethylcyclohexane, 3,4-epoxyvinylcyclohexane, epoxycycloheptane, styrene oxide, p-chlorostyrene oxide, p-ethylstyrene oxide, benzylethylene oxide, glycidyl acrylate, phenyl glycidyl ether, 2,3-epoxycyclopentyl cyclopentyl ether, 6-methyl 3,4-epoxycyclohexylmethyl acetate, and the like.

The aldehydes employed in producing the interpolymers of the instant invention have a single aldehyde group and are free of other functional groups which are reactive under the polymerization conditions employed. The aldehydes suitable for use can be represented by the formula

wherein $R^2$ is as above defined. Representative of the many aldehydes which can be employed are formaldehyde, acetaldehyde, propionaldehyde, butyraldehyde, isobutyraldehyde, crotonaldehyde, valeraldehyde, caproaldehyde, 2-pentenaldehyde, 2,4-pentadienaldehyde, enanthaldehyde, hendecanaldehyde, 1-cyclohexene-1-carboxaldehyde, cinnamaldehyde, 2-furaldehyde, and the like.

The ketones employed in producing the interpolymers of the instant invention have a single carbonyl group and are free of other functional groups which are reactive under the polymerization conditions employed. The ketones suitable for use can be represented by the formula

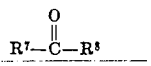

wherein $R^7$ and $R^8$ are as above defined. Illustrative of the many ketones which can be employed are acetone, 1-chloro-2-propanone, 2-pentanone, 3-pentanone, 1,4-dichloro-3-pentanone, butyrone, cyclobutyl ketone, 3-cyclohexen-1-one, and the like.

The fluorinated ketones employed in producing the interpolymers of the instant invention have a single carbonyl group and are free of other functional groups which are reactive under the polymerization conditions employed. The ketones suitable or use can be represented by the formula

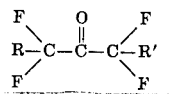

wherein R and $R^1$ are as above defined. Representative of the fluorinated ketones which can be employed are hexafluoroacetone,

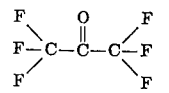

chloropentafluoroacetone,

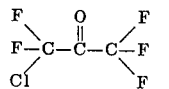

1,3-dichloro-1,1,3,3-tetrafluoroacetone,

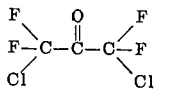

perfluoro-4- heptanone,

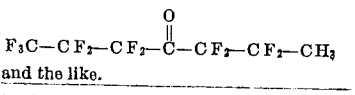

and the like.

The interpolymers of the instant invention can contain from 0.01 mole percent to 50 mole percent, preferably from 0.1 mole percent to 1 mole percent, of such fluorinated ketones combined with from 50 mole percent to 99.99 mole percent, preferably from 99 mole percent to 99.9 mole percent, of at least one member selected from the group consisting of aldehydes, epoxides, and ketones other than such fluorinated ketones. The fluorinated ketones are preferably interpolymerized with aldehydes and/or epoxides as interpolymers containing other ketones are relatively less stable. Terpolymers of fluorinated ketones, aldehydes, and epoxides can contain from 0.01 mole percent to 50 mole percent of combined fluorinated ketone, from 10 mole percent to 99.8 mole percent of combined aldehyde, and from 0.1 mole percent to 89.9 mole percent of combined epoxide. Usually these terpolymers contain from 0.1 mole percent to 1 mole percent of combined fluorinated ketone, from 75 mole percent to 97.9 mole percent of combined aldehyde, and from 2 mole percent to 24.9 mole percent of combined epoxide. When the terpolymer contains a ketone other than the fluorinated ketone in place of the epoxide, like amounts of each comonomer can be present in the terpolymer.

By adjusting the concentration of monomers employed in the polymerization, it is possible to produce interpolymers having widely varying properties. By way of illustration, interpolymers having high thermal stability can be prepared by polymerizing a mixture containing an aldehyde and an epoxide in addition to the fluorinated ketone. While homopolymers of acetaldehyde and other aldehydes are known to be useful in the production of molded and extruded objects, these polymers are of limited value because of their poor thermal stability and the ease with which they undergo degradation to aldehyde monomer and polymers of lower molecular weight. However, when an epoxide is interpolymerized into the polyaldehyde molecules in accordance with the instant invention, the thermal stability of the polymer is dramatically improved, while none of the other properties, such as water insolubility in the case of polyacetaldehyde, are adversely affected. The resulting interpolymers can be molded and fabricated at higher temperatures, and exposed to elevated temperatures for longer periods, than can conventional aldehyde polymers, and remain stable for at least a year at room temperature without suffering any marked changes in physical appearance.

The interpolymers of the instant invention are prepared by polymerizing a mixture containing from 0.01 mole percent to 50 mole percent, preferably from 0.1 mole percent to 1 mole percent, of a suitable fluorinated ketone, and from 50 mole percent to 99.99 mole percent, preferably from 99 mole percent to 99.9 mole percent, of at least one member selected from the group consisting of aldehydes, epoxides and ketones other than such fluorinated ketones. When terpolymers of fluorinated ketones, aldehydes, and epoxides are desired, mixtures containing from 0.01 mole percent to 50 mole percent, preferably from 0.1 mole percent to 1 mole percent, of the fluorinated ketone, from 1 mole percent to 99.8 mole percent, preferably from 70 mole percent to 89.9 mole percent, of aldehyde, and from 0.1 mole percent to 98.9 mole percent, preferably from 10 mole percent to 29.9 mole percent, of epoxide, can be employed. When a ketone other than the fluorinated ketone is employed in place of an epoxide, like mixtures of fluorinated ketone, aldehyde, and other ketone can be employed.

No catalyst need be employed in effecting interpolymerization according to the process of the instant invention as the fluorinated ketones employed as comonomers act as catalysts in addition to interpolymerizing with the other monomers present. Such fluorinated ketones are effective polymerization catalysts for aldehydes, epoxides, and ketones, and such compounds readily undergo polymerization when contacted with such catalysts even in the presence of air and moisture. If the fluorinated ketone is employed in an amount such that it is completely interpolymerized, no catalyst residue will be left in the reaction mixture and tedious and time consuming procedures for purifying the polymer can be avoided. However, if an excess of fluorinated ketone is employed, it should be removed as soon as polymerization is complete, as it may cause depolymerization of the polymer if the reaction mixture is allowed to stand at temperatures above which polymerization does not take place. Usually polymerization readily occurs at temperatures ranging from $-130°$ C. to $0°$ C., preferably ranging from $-80°$ C. to $-50°$ C.

Atmospheric pressure is usually employed in affecting polymerization as a matter of convenience. However, pressures both above and below atmospheric pressure, for example pressures ranging from as low as 0.5 atmosphere, or lower, to as high as 1000 atmospheres, or higher, can also be employed.

If desired, polymerization according to the instant invention can be effected in an inert, liquid solvent. The only requirement in the selection of the solvent is that it be liquid at the reaction temperature ad that it does not interfere with the reaction in any way whatsoever. The concentration of monomers in the solvent can vary from about 5 percent by weight to about 50 percent by weight, preferably from about 20 percent by weight to about 40 percent by weight. Suitable solvents include, among others, saturated aliphatic hydrocarbons such as hexane, heptane, pentane, isooctane, purified kerosene, and the like; saturated cycloaliphatic hydrocarbons such as cyclopentane, cyclohexane, methylcyclopentane, dimethylcyclopentane, and the like; aromatic hydrocarbons such as benzene, toluene, xylene, and the like; chlorinated hydrocarbons such as methylene chloride, and the like; and ethers such as diethyl ether, vinyl n-butyl ether, tetrahydrofuran, dioxan, and the like.

After the polymerization reaction is complete, the polymer is separated from the reaction mixture and dried. This can be accomplished in the manner illustrated by the examples.

The copolymers of the instant invention are thermoplastic resins which can be molded and extruded to produce shaped articles, and used in the preparation of films and coatings.

The following examples are set forth for purposes of illustration so that those skilled in the art may better understand this invention, and it should be understood that they are not to be construed as limiting this invention in any manner. The testing techniques employed in evaluating the polymers of said examples are as follows:

TENSILE STRENGTH—A.S.T.M. D882–56T
ULTIMATE ELONGATION—A.S.T.M. D882–56T
STIFFNESS—The modulus of elasticity of a polymer as measured by an Instron Tester. The stiffness modulus is calculated by multiplying by 100 the force in pounds per square inch necessary to stretch a sample of the polymer 1 percent of its original length.
GLASS TRANSITION TEMPERATURE—That temperature at which the curve obtained from a plot of mechanical loss against temperature is a maximum. See Schmeider et al., "Kolloid-Z," 127, 65 (1952).
REDUCED VISCOSITY ($I_R$)—Determined by the equation $$I_R = \frac{\frac{\Delta N}{N_o}}{C}$$

wherein $\Delta N$ is the difference in seconds between the flow-time of a solution of polymer through a capillary viscometer and the flow-time of the solvent, $N_o$ represents the flow-time of the solvent, and C is the concentration of polymer in said solution in grams per 100 milliliters of solvent. The value of $$\frac{\Delta N}{N_o}$$

is known as the specific viscosity. Unless otherwise specified, all viscosity measurements were made at 30° C. employing a solution of 0.2 gram of polymer per 100 milliliters of chloroform. EXAMPLE 1

To a 4-inch test tube cooled in a dry ice-acetone bath were charged, under a nitrogen atmosphere, 10 milliliters of isobutyraldehyde (0.11 mole), and 0.2 milliliter of hexafluoroacetone (0.002 mole). The isobutyraldehyde employed had been distilled form sodium carbonate under a nitrogen atmosphere and passed over activated alumina in order to remove any moisture and isobutyric acid present.

The tube was sealed and allowed to stand in the bath for several hours (bath temperature = –78° C.). At the end of this time, the tube was opened and the solidified contents therein were removed and ground in a Waring Blender with methylene chloride. The resulting mixture was filtered, and the precipitate collected was dried at room temperature under vacuum. About 1.2 grams of a tough, translucent copolymer of isobutyraldehyde and hexafluoroacetone were obtained.

When the procedure was repeated employing 0.7 milliliter of hexafluoroacetone, 6.5 grams of copolymer were recovered. Elemental analysis for fluorine indicated the presence of 4.2 percent by weight of hexafluoroacetone in the copolymer. EXAMPLE 2

Ten (10) milliliters of isobutyraldehyde (0.11 mole) were charged to an 8-inch glass pressure tube and air was bubbled through the isobutyraldehyde for 10 seconds at a frequent rate. The tube was then cooled to –78° C. in a dry ice-acetone bath, and 3 milliliters of distilled hexafluoroacetone (0.024 mole) were added thereto. The tube was sealed and allowed to stand in the bath overnight. Following this, the tube was opened and the solidified contents therein were removed and ground in a Waring Blender with methylene chloride. The resulting mixture was filtered, ash the precipitate collected was dried at room temperature. About 5.7 grams of a tough, translucent copolymer of isobutyraldehyde and hexafluoroacetone were recovered.

When air was bubbled through the isobutyraldehyde for 100 seconds instead of 10 seconds in the above procedure, 6.6 grams of copolymer were recovered.

When 0.03 milliliter of water was added to the isobutyraldehyde in place of air in the above procedure and the reaction was run under a nitrogen atmosphere, 3.8 grams of copolymer were recovered.

When the procedure was repeated employing 0.3 milliliter of water and the reaction was run under a nitrogen atmosphere, 2.0 grams of copolymer were recovered.

When 0.05 gram of hydroquinone monomethyl ether was employed in place of water and the reaction was run under a nitrogen atmosphere, 4.2 grams of copolymer were recovered. Since hydroquinone monomethyl ether is a known free radical polymerization inhibitor, this showed the copolymer was not formed by a free radical mechanism. EXAMPLE 3

To an 8-inch glass pressure tube cooled in a dry ice-acetone bath (bath temperature = –78° C.) were charged, under a nitrogen atmosphere, 7 milliliters of isobutyraldehyde (0.077 mole), 3 milliliters of ethylene oxide (0.06 mole), and 2 milliliters of hexafluoroacetone (0.016 mole). The tube was sealed and allowed to stand in the bath for 4 days. At the end of this time the contents of the tube had completely solidified.

When the tube was allowed to stand at room temperature for several more days, the contents of the tube liquefied and only a small amount of solid material remained. Liquefication was due to depolymerization of the polymer at higher temperatures in the presence of excess catalyst.

When 3 milliliters of 1,2-epoxypropane (0.029 mole) were employed in place of ethylene oxide, identical results were obtained. EXAMPLE 4

To an 8-inch glass pressure tube cooled in a dry ice-acetone bath (bath temperature = –78° C.) were charged, under a nitrogen atmosphere, 7 milliliters of isobutyraldehyde (0.077 mole), 3 milliliters of epoxycyclohexane (0.03 mole), and 2 milliliters of hexafluoroacetone (0.016 mole). The tube was sealed and allowed to stand in the bath for 2 days. At the end of this time, the tube was opened and the contents therein were dissolved in methylene chloride. The resulting solution was mixed with methanol, and the precipitate produced thereby was collected by filtration and dried at room temperature under vacuum. About 3.5 grams of a terpolymer of isobutyraldehyde, epoxycyclohexane, and hexafluoroacetone were recovered. The terpolymer had a reduced viscosity of 0.17 in chloroform. Elemental analysis showed a carbon content of 69.67 percent, a hydrogen content of 10.62 percent, and a fluorine content of 0.80 percent, indicating the presence of 55 percent by weight of epoxycyclohexane, 44 percent by weight of isobutyraldehyde, and 1 percent by weight of hexafluoroacetone, in the terpolymer. After heating a 0.6790 gram portion of the terpolymer in a forced air oven for 90 minutes at a temperature of 100° C., about 90 percent of the copolymer remained.

A clear, brittle, plaque was molded from the terpolymer at 75° C. EXAMPLE 5

To an 8-inch glass pressure tube were charged, under a nitrogen atmosphere, 10 milliliters of isobutyraldehyde (0.11 mole) and 3 milliliters of styrene oxide (0.023 mole). The tube was then cooled to –78° C. in a dry ice-acetone bath, and 2 milliliters of distilled hexafluoracetone (0.016 mole) were added thereto. The tube was sealed and allowed to stand in the bath for 2 days. Following this, the tube was opened and the solidified contents therein were removed and ground in a Waring Blender with a mixture of nine parts by volume of methylene chloride and one part by volume of pyridine. The resulting mixture was filtered, and the precipitate collected was dried at room temperature under vacuum. About 0.7 gram of a tan terpolymer of isobutyraldehyde, styrene oxide, and hexafluoroacetone were obtained. Infrared spectrophotometric analysis of the product indicated the styrene oxide comonomer had been incorporated therein.

The filtrate from the above procedure was mixed with methanol, and the precipitate produced thereby was collected by filtration and dried at room temperature under vacuum. About 5.9 grams of a terpolymer of isobutyraldehyde, styrene oxide, and hexafluoracetone were recovered. Infrared spectrophotometric analysis of the product indicated the styrene oxide comonomer had been incorporated therein. The terpolymer had a reduced viscosity of 0.22 in chloroform.

When the procedure was repeated employing 3 milliliters of glycidyl acrylate in place of the styrene oxide, 3.1 grams of a white, insoluble terpolymer of isobutyraldehyde, glycidyl acrylate, and hexafluoroacetone were recovered. Infrared spectrophotometric analysis of the product indicated the glycidyl acrylate comonomer had been incorporated therein.

When the procedure was again repeated employing 2,3-epoxybutane as the epoxide comonomer (3milliliters) and the polymerization was allowed to proceed for 3 days, 2.0 grams of a white, insoluble terpolymer of isobutyraldehyde, 2,3-epoxybutane, and hexafluoroacetone were recovered.

When 3,4-epoxyvinylcyclohexane was employed as the epoxide comonomer (3 milliliters) and the polymerization was allowed to proceed for 3 days, 7.2 grams of a white, solid, soluble terpolymer of isobutyraldehyde, 3,4-epoxyvinylcyclohexane, and hexafluoroacetone were recovered. The terpolymer had a reduced viscosity of 0.26 in chloroform.

When 6-methyl 3,4-epoxycyclohexylmethyl acetate was employed as the epoxide comonomer (3 milliliters) and the polymerization was allowed to proceed for 6 days, 0.6 gram of a white, solid, soluble terpolymer of isobutyraldehyde, 6-methyl 3,4-epoxycyclohexylmethyl acetate, and hexafluoroacetone were recovered. Infrared spectrophotometric analysis of the product indicated the 6-methyl 3,4epoxycyclohexylmethyl acetate comonomer had been incorporated therein. The terpolymer had a reduced viscosity of 0.51 in chloroform.

When 2,3-epoxycyclopentyl cyclopentyl ether was employed as the epoxide comonomer (3 milliliters) and the polymerization was allowed to proceed for 6 days, 2.65 grams of a white, insoluble terpolymer of isobutyraldehyde, 2,3-epoxycyclopentyl cyclopentyl ether, and hexafluoroacetone were recovered.

When epoxycyclohexane was employed as the epoxide comonomer (3 milliliters) and the polymerization was allowed to proceed for 6 days, 1.7 grams of a white, insoluble terpolymer of isobutyraldehyde, epoxycyclohexane, and hexafluoroacetone, and 5.5 grams of white soluble terpolymer, were recovered. The soluble terpolymer had a reduced viscosity of 0.42 in chloroform. EXAMPLE 6

Five milliliters of epoxycyclohexane (0.05 mole) were charged, under a nitrogen atmosphere, to an 8-inch glass pressure tube. The tube was then cooled to −78° C. in a dry ice-acetone bath, and 2 milliliters of distilled hexafluoroacetone (0.016 mole) were added thereto. The tube was then sealed and allowed to stand in the bath for 1 day. Following this, the tube was opened and the contents therein were dissolved in a mixture of nine parts by volume of methylene chloride and one part by volume of pyridine. The resulting solution was mixed with methanol, and the precipitate produced thereby was collected by filtration and dried at room temperature under vacuum. About 3.15 grams of a copolymer of epoxycyclohexane and hexafluoroacetone were recovered. The copolymer had a reduced viscosity of 0.44 when measured as a one-tenth percent by weight solution in cyclohexanone. Elemental analysis for fluorine indicated the presence of 9 percent by weight of hexafluoroacetone in the copolymer. EXAMPLE 7

Three milliliters of epoxycyclohexane (0.03 mole) and 7 milliliters of isobutyraldehyde (0.077 mole) were charged to an 8-inch glass pressure tube, and air was bubbled through the mixture for 30 seconds at a frequent rate. The tube was then cooled to −78° C. in a dry ice-acetone bath, and 2 milliliters of distilled hexafluoroacetone (0.016 mole) were added thereto. The tube was sealed and allowed to stand in the bath for 20 days. Following this, the tube was opened and the contents therein were added to a mixture of nine parts by volume of methylene chloride and one part by volume of pyridine. The resulting mixture was filtered, and the precipitate collected was dried at room temperature under vacuum. About 0.3 gram of a white, insoluble terpolymer of epoxycyclohexane, isobutyraldehyde, and hexafluoroacetone were recovered.

The filtrate from the above procedure was mixed with methanol, and the precipitate produced thereby was collected by filtration and dried at room temperature under vacuum. About 4.5 grams of a white terpolymer of epoxycyclohexane, isobutyraldehyde, and hexafluoroacetone were recovered. THe terpolymer had a reduced viscosity of 0.54 in chloroform. Elemental analysis indicated the terpolymer had a composition of about 38.0 percent by weight of epoxycyclohexane, 60.6 percent by weight of isobutyraldehyde, and 1.4 percent by weight of hexafluoroacetone. After heating a 0.9720 gram portion of the terpolymer in a forced air oven for 60 minutes at a temperature of 100° C., about 90 percent of the terpolymer remained.

When isobutyraldehyde was homopolymerized in the same manner, less than 5 percent of the polymer remained after heating a 0.6740 gram sample of the homopolymer in a forced air oven for 60 minutes at a temperature of 100° C.

When air was bubbled through the epoxycyclohexane-isobutyraldehyde mixture for 100 seconds instead of 30 seconds in the above procedure, 3.1 grams of white, soluble terpolymer were recovered. The terpolymer had a reduced viscosity of 0.096 in chloroform. Elemental analysis indicated the terpolymer had a composition of 26.7 percent by weight of epoxycyclohexane, 70.8 percent by weight of isobutyraldehyde, and 2.5 percent by weight of hexafluoroacetone. After heating a 0.9660 gram portion of the terpolymer in a forced air oven for 60 minutes at a temperature of 100° C., about 65 percent of the terpolymer remained.

When 0.03 milliliter of water was added to the epoxycyclohexane-isobutyraldehyde mixture in place of air in the above procedure and the reaction was run under a nitrogen atmosphere, 1.5 grams of white, insoluble terpolymer and 2.9 grams of white, soluble terpolymer, were recovered. The terpolymer had a reduced viscosity of 0.37 in chloroform. Elemental analysis indicated the terpolymer had a composition of about 38.0 percent by weight of epoxycyclohexane, 60.6 percent by weight of isobutyraldehyde, and 1.4 percent by weight of hexafluoroacetone. After heating a 1.0090 gram portion of the terpolymer in a forced air oven for 60 minutes at a temperature of 100° C., about 87 percent of the terpolymer remained.

When the procedure was repeated employing 0.3 milliliter of water and the reaction was run under a nitrogen atmosphere, 4.4 grams of white soluble terpolymer were recovered. The terpolymer had a reduced viscosity of 0.28 in chloroform. Elemental analysis indicated the terpolymer had a composition of about 38.0 percent by weight of epoxycyclohexane, 60.6 percent by weight of isobutyraldehyde, and 1.4 percent by weight of hexafluoroacetone. After heating a 0.9780 gram portion of the terpolymer in a forced air oven for 60 minutes at a temperature of 100° C., about 83 percent of the terpolymer remained. EXAMPLE 8

To an 8-inch glass pressure tube cooled in a dry ice-acetone bath (bath temperature = −78° C.) were charged, under a nitrogen atmosphere, 10 milliliters of isobutyraldehyde and 2 milliliters of 1,3-dichloro-1,1,3,3-tetrafluoroacetone. The tube was sealed and allowed to stand in the bath for 2 weeks. At the end of this time, the tube was opened and the contents therein were added to a mixture of nine parts by volume of methylene chloride and one part by volume of pyridine. The resulting mixture was filtered, and the precipitate collected was dried at room temperature under vacuum. About 2.9 grams of an insoluble, translucent copolymer of isobutyraldehyde and 1,3-dichloro-1,1,3,3-tetrafluoroacetone were recovered. Elemental analysis indicated the presence of 9.8 percent by weight of 1,3-dichloro-1,1,3,3-tetrafluoroacetone in the copolymer. EXAMPLE 9

To an 8-inch glass pressure tube cooled in a dry ice-acetone bath (bath temperature = −78° C.) were charged, under a nitrogen atmosphere, 7 milliliters of isobutyraldehyde, 3 milliliters of epoxycyclohexane, and 2 milliliters of 1,3-dichloro-1,1,3,3-tetrafluoroacetone. The tube was sealed and allowed to stand in the bath for 2 weeks. At the end of this time, the tube was opened and the contents therein were added to a mixture of nine parts by volume of methylene chloride and one part by volume of pyridine. The resulting solution was mixed with methanol, and the precipitate produced thereby was collected by filtration and dried at room temperature under vacuum. About 2.9 grams of a white terpolymer of isobutyraldehyde, epoxycyclohexane, and 1,3-dichloro-1,1,3,3-tetrafluoroacetone were recovered. The terpolymer had a reduced viscosity of 0.31 in chloroform. Elemental analysis indicated the terpolymer had a composition of 9.8 percent by weight of 1,3-dichloro-1,1,3,3-tetrafluoroacetone, 50.7 percent by weight of epoxycyclohexane, and 39.5 percent by weight of isobutyraldehyde. Investigation of the product by fluorine nuclear magnetic resonance techniques revealed that the incorporation of the 1,3-dichloro-1,1,3,3-tetrafluoroacetone had not occurred by halogen displacement. EXAMPLE 10

Five grams of pure, liquid formaldehyde were freshly prepared by the pyrolysis of paraformaldehyde and added to a glass pressure tube cooled in a dry ice-acetone bath (bath temperature = −78° C.). After 2 milliliters of epoxycyclohexane were added to the tube under a nitrogen atmosphere, hexafluoroacetone was distilled into the tube, causing a violent reaction. Following this, methylene chloride was added, and the mixture was allowed to warm to room temperature.

The warm mixture was then ground in a Waring Blender with additional methylene chloride, The resulting mixture was filtered, and the precipitate collected was dried. About 3.0 grams of white, powderlike terpolymer of formaldehyde, epoxycylclohexane, and hexafluoroacetone were recovered. The terpolymer had a tensile strength of 2,350 p.s.i., an ultimate elongation of 95 percent, a stiffness modulus of 48,000 p.s.i., and a softening temperature of about 100° C. Elemental analysis indicated the terpolymer had a composition of 65 percent by weight of formaldehyde, 23 percent by weight of epoxycyclohexane, and 12 percent by weight of hexafluoroacetone. After heating a 0.3220 gram portion of the terpolymer in a forced air oven for 60 minutes at a temperature of 150° C., about 72 percent of the terpolymer remained.

A flexible plaque was molded from the terpolymer under pressure at 165° C.

When the above procedure was repeated without any epoxycyclohexane, a solid copolymer of formaldehyde and hexafluoroacetone was obtained. After heating a 0.5570 gram portion of the copolymer in a forced air oven for 60 minutes at a temperature of 150° C., about 65 percent of the copolymer remained. EXAMPLE 11

Six milliliters of pure, liquid formaldehyde were freshly prepared by the pyrolysis of paraformaldehyde and added to a glass pressure tube cooled in a dry ice-acetone bath (bath temperature =−78° C.). Two milliliters of styrene oxide were then added to the tube under a nitrogen atmosphere, followed by 1 milliliter of 1,3-dichloro-1,1,3,3-tetrafluoroacetone. The tube was then sealed and allowed to stand in the bath for 1 day. At the end of this time, the tube was opened and the contents therein were added to a mixture of nine parts by volume of methylene chloride and one part by volume of pyridine. The resulting mixture was filtered, and the precipitate collected was dried at room temperature under vacuum. About 1.3 grams of a white terpolymer of formaldehyde, styrene oxide, and 1,3-dichloro-1,1,3,3-tetrafluoroacetone were recovered. Elemental analysis indicated the terpolymer had a composition of 66.1 percent by weight of formaldehyde, 2.5 percent by weight of styrene oxide, and 31.4 percent by weight of 1,3-dichloro-1,1,3,3-tetrafluoroacetone.

When the procedure was repeated employing 2 milliliters of 2,3-epoxybutane in place of the styrene oxide 1.7 grams of a white insoluble terpolymer of formaldehyde, 2,3-epoxybutane, and 1,3-dichloro-1,1,3,3-tetrafluoroacetone were recovered. Elemental analysis indicated the terpolymer had a composition of 68.0 percent by weight of formaldehyde, 24.6 percent by weight of 2,3-epoxybutane, and 7.4 percent by weight of 1,3-dichloro-1,1,3,3-tetrafluoroacetone.

When the procedure was again repeated without any epoxide comonomer, 4.0 grams of a white, insoluble copolymer of formaldehyde and 1,3-dichloro-1,1,3,3-tetrafluoroacetone were recovered. Elemental analysis indicated the copolymer had a composition of 88.6 percent by weight of formaldehyde and 11.4 percent by weight of 1,3-dichloro-1,1,3,3-tetrafluoroacetone. EXAMPLE 12

Five milliliters of pure, liquid formaldehyde were freshly prepared by the pyrolysis of paraformaldehyde and added to a glass pressure tube cooled in a dry ice-acetone bath (bath temperature = −78° C.). One milliliter of 2,3-epoxybutane was then added to the tube under a nitrogen atmosphere, followed by 0.5 milliliter of hexafluoroacetone. The tube was then sealed and allowed to stand in the bath for a short time. At the end of this time, the tube was opened, isooctane was added, and the mixture was allowed to warm to room temperature.

The warm mixture was then filtered, and the precipitate collected was washed with isooctane and air dried at room temperature. About 3.5 grams of a white terpolymer of formaldehyde, 2,3-epoxybutane, and hexafluoroacetone were recovered. Elemental analysis indicated the terpolymer had a composition of 66.3 percent by weight of formaldehyde, 15.4 percent by weight of 2,3-epoxybutane, and 18.3 percent by weight of hexafluoroacetone.

When the procedure was repeated employing 5 milliliters of acetone in place of the 2,3-epoxybutane, 5.3 grams of a white insoluble terpolymer of formaldehyde, acetone, and hexafluoroacetone were recovered. Elemental analysis indicated the terpolymer had a composition of 69.3 percent by weight of formaldehyde, 24.1 percent by weight of acetone, and 6.6 percent by weight of hexafluoroacetone.

The formaldehyde-acetone-hexafluoroacetone terpolymer was thermally decomposed under vacuum to produce the original monomers. These monomers were identified by mass spectrometric techniques. This showed the terpolymer to be an addition polymer and not a condensation polymer.

We claim:

1. A copolymer resin of from 99 mole percent to 99.9 mole percent of isobutyraldehyde and from 0.1 mole percent to 1 mole percent of hexafluoracetone.

2. An interpolymer resin of from 75 mole percent to 97.9 mole percent of isobutyraldehyde, from 2 mole percent to 24.9 mole percent of ethylene oxide and from 0.1 mole percent to 1 mole percent of hexafluoroacetone.

3. An interpolymer resin of from 75 mole percent to 97.9 mole percent of isobutyraldehyde, from 2 mole percent to 24.9 mole percent of 1,2-epoxypropane and from 0.1 mole percent to 1 mole percent of hexafluoroacetone.

4. An interpolymer resin of from 75 mole percent to 97.9 mole percent of isobutyraldehyde, from 2 mole percent to 24.9 mole percent of epoxycyclohexane and from 0.1 mole percent to 1 mole percent of hexafluoroacetone.

5. An interpolymer resin of from 75 mole percent to 97.9 mole percent of isobutyraldehyde, from 2 mole percent to 24.9 mole percent of styrene oxide and from 0.1 mole percent to 1 mole percent of hexafluoroacetone.

6. An interpolymer resin of from 75 mole percent to 97.9 mole percent of isobutyraldehyde, from 2 mole percent to 24.9 mole percent of glycidyl acrylate and from 0.1 mole percent to 1 mole percent of hexafluoroacetone.

7 An interpolymer resin of from 75 mole percent to 97.9 mole percent of isobutyraldehyde, from 2 2 percent to 24.9 mole percent of 2,3-epoxybutane and from 0.1 mole percent to 1 mole percent of hexafluoroacetone.

8. An interpolymer resin of from 75 mole percent to 97.9 mole percent of isobutyraldehyde, from 2 mole percent to 24.9 mole percent of 3,4-epoxyvinylcyclohexane and from 0.1 mole percent to 1 mole percent of hexafluoroacetone.

9. An interpolymer resin of from 75 mole percent to 97.9 mole percent of isobutyraldehyde, from 2 mole percent to 24.9 mole percent of 6-methyl 3,4-epoxycyclohexylmethyl acetate and from 0.1 mole percent to 1 mole percent of hexafluoroacetone.

10. An interpolymer resin of from 75 mole percent to 97.9 mole percent of isobutyraldehyde, from 2 mole percent to 24.9 mole percent of 2,3-epoxycyclopentyl cyclopentyl ether and from 0.1 mole percent to 1 mole percent of hexafluoroacetone.

11. A copolymer resin of from 99 mole percent to 99.9 mole percent of isobutyraldehyde and from 0.1 mole percent to 1 mole percent of 1,3-dichloro-1,1,3,3-tetrafluoroacetone.

12. An interpolymer resin of from 75 mole percent to 97.9 mole percent of isobutyraldehyde, from 2 mole percent to 29.9 mole percent of epoxycyclohexane and from 0.1 mole percent to 1 mole percent of 1,1,3,3-tetrafluoroacetone.

13. An interpolymer resin of from 75 mole percent to 97.9 mole percent of formaldehyde, from 2 mole percent to 29.9 mole percent of acetone and from 0.1 mole percent to 1 mole percent of hexafluoroacetone.

* * * * *